United States Patent Office 2,761,862
Patented Sept. 4, 1956

2,761,862

PROCESS FOR THE MANUFACTURE OF XANTHINE DERIVATIVES

Karl Doebel and Hans Spiegelberg, Basel, Switzerland, assignors to Hoffmann-La Roche Inc., Nutley, N. J., a corporation of New Jersey No Drawing. Application September 9, 1954,
Serial No. 455,066

Claims priority, application Switzerland
September 17, 1953

7 Claims. (Cl. 260—256)

The present invention provides novel xanthine derivatives of the general formula

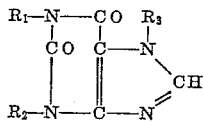

wherein $R_1$ and $R_2$ stand for lower alkyl groups, preferably methyl groups, and $R_3$ stands for the β-cyanoethyl or ω-aminopropyl group, as well as acid addition salts thereof. The said compounds show a pronounced dilatory action on the coronary arteries and may therefore be used as pharmaceuticals. They may also be employed as intermediates in the synthesis of other compounds with similar action.

The novel xanthine derivatives mentioned above may by produced by reacting in an organic solvent, such as pyridine, 1,3-dialkyl-xanthines with acrylonitrile in the presence of basic catalysts and of polymerisation inhibitors, at a temperature of 100–150° C., and, if desired, hydrogenating the 1,3-dialkyl-7-(β-cyanoethyl)-xanthines formed, under pressure and in the presence of hydrogenation catalysts, to produce the corresponding 1,3-dialkyl-7-(ω-aminopropyl)-xanthines. The preferred starting material is theophylline; when using this compound, the product first obtained is 7-(β-cyanoethyl)-theophylline which in turn may be hydrogenated to form 7-(ω-aminopropyl)-theophylline.

Suitable basic catalysts are for example alkali alcoholates, such as sodium ethylate, and suitable polymerisation inhibitors are for example salts of bivalent copper, preferably cupric sulphate.

Example 36 parts by weight of theophylline, 21 parts by weight of arcrylonitrile, 3 parts by weight of sodium ethylate, 1 part by weight of cupric sulphate and 250 parts by weight of absolute pyridine are mixed and heated in the autoclave to 150° C. for 5 hours. Thereafter, the pyridine is removed in vacuo and the residue is crystallised in alcohol, while adding charcoal. 7-(β-cyanoethyl)-theophylline in form of leaflets of melting point 151–153° C. is obtained in excellent yield.

10 parts by weight of 7-(β-cyanoethyl)-theophylline are suspended in 100 parts by volume of methanol and 10 parts by weight of Raney cobalt catalyst are added. The suspension is then shaken with hydrogen under a pressure of 100 atm. at a temperature of 100° C. for one hour. The clear methanolic solution is filtered off from the catalyst and the filtrate is evaporated in vacuo. There are obtained 11 parts by weight of a colourless syrup of 7-(ω-aminopropyl)-theophylline, which occasionally crystallizes spontaneously. In order to convert the free base into the hydrochloride, 20 parts by volume of an ethanolic hydrochloride acid solution are added. The mixture is evaporated in vacuo. Upon adding ethanol or a mixture of methanol and ether, the hydrochloride of 7-(ω-aminopropyl)-theophylline crystallizes in rosettes of melting point 258–260° C. The yield is quantitative.

We claim:

1. 7-(β-cyanoethyl)-theophylline.
2. The process of claim 6, wherein theophylline is used as starting material.
3. The process of claim 2, wherein cupric sulphate is used as polymerisation inhibitor.
4. The process of claim 2, wherein Raney cobalt is used as hydrogenation catalyst.
5. The process of claim 2, wherein sodium methylate is used as basic catalyst.
6. A process which comprises reacting a 1,3-dilower-alkyl xanthine with acrylonitrile in the presence of an alkali alcoholate catalyst and a bivalent copper salt polymerization inhibitor at a temperature of 100 to 150° C. and hydrogenating the reaction product in the presence of a cobalt hydrogenation catalyst.
7. A process which comprises reacting a 1,3-dilower-alkyl xanthine with acrylonitrile in the presence of an alkali alcoholate catalyst and a bivalent copper salt polymerization inhibitor at a temperature of 100 to 150° C.

References Cited in the file of this patent

Hildebrandt: Deut. Med. Wochschr. 77, 13–15 (1952), cited in Chem. Abst., 46, 2689 (b) (1952).